United States Patent
Park et al.

(10) Patent No.: US 9,874,657 B2
(45) Date of Patent: Jan. 23, 2018

(54) COMPENSATION FILM AND OPTICAL FILM AND DISPLAY DEVICE

(71) Applicant: SAMSUNG ELECTRONICS CO., LTD., Suwon-si, Gyeonggi-do (KR)

(72) Inventors: Kitae Park, Suwon-si (KR); Dmitry Androsov, Suwon-si (KR); Masashi Tsuji, Hwaseong-si (KR); Hyunseok Choi, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/150,876

(22) Filed: May 10, 2016

(65) Prior Publication Data

US 2017/0199305 A1    Jul. 13, 2017

(30) Foreign Application Priority Data

Jan. 7, 2016   (KR) .................. 10-2016-0002268

(51) Int. Cl.
   *G02B 5/30*    (2006.01)
   *G02B 1/04*    (2006.01)

(52) U.S. Cl.
   CPC ............. *G02B 1/04* (2013.01); *G02B 5/3033* (2013.01); *G02B 5/3083* (2013.01)

(58) Field of Classification Search
   CPC ....... G02B 1/04; G02B 5/3033; G02B 5/3083
   USPC ............. 359/487.02, 489.02, 489.07, 489.03
   See application file for complete search history.

(56) References Cited

U.S. PATENT DOCUMENTS

| | | | |
|---|---|---|---|
| 6,881,454 B2 * | 4/2005 | Taguchi ............. | C09K 19/3475 252/299.01 |
| 8,344,083 B2 | 1/2013 | Um et al. | |
| 8,613,986 B2 | 12/2013 | Um et al. | |
| 8,679,376 B2 * | 3/2014 | Lee ...................... | G02B 5/3033 252/299.62 |
| 8,822,614 B2 | 9/2014 | Yonemura et al. | |
| 9,250,371 B2 * | 2/2016 | Won .................. | G02F 1/133533 |
| 2004/0201805 A1 | 10/2004 | Nishikouji et al. | |

(Continued)

FOREIGN PATENT DOCUMENTS

| | | |
|---|---|---|
| JP | 2009-053492 | 3/2009 |
| JP | 2015-060173 | 3/2015 |
| KR | 10-1091534 B1 | 12/2011 |

*Primary Examiner* — Ricky D Shafer
(74) *Attorney, Agent, or Firm* — Cantor Colburn LLP

(57) ABSTRACT

A compensation film including a polymer having a first structural unit represented by Chemical Formula 1, and having a photoelastic coefficient of less than or equal to about $40 \times 10^{-13}$ cm$^2$/dyn Chemical Formula 1

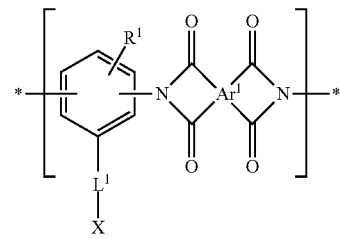

wherein in Chemical Formula 1, $Ar^1$, X, $L^1$, and $R^1$ are the same as described in the detailed description.

19 Claims, 4 Drawing Sheets

(56) References Cited

U.S. PATENT DOCUMENTS

| | | | | |
|---|---|---|---|---|
| 2009/0033835 A1* | 2/2009 | Fukagawa | ............ | G02B 5/3016 |
| | | | | 349/96 |
| 2009/0051856 A1* | 2/2009 | Sugiyama | .................. | C08J 5/18 |
| | | | | 349/96 |
| 2012/0140161 A1* | 6/2012 | Nimura | .................. | G02B 5/208 |
| | | | | 349/194 |
| 2014/0254012 A1* | 9/2014 | Moon | ..................... | G02B 5/305 |
| | | | | 359/487.02 |
| 2014/0307218 A1* | 10/2014 | Ryu | .................. | C09K 19/3809 |
| | | | | 349/187 |
| 2015/0124320 A1* | 5/2015 | Moon | ..................... | G02B 1/08 |
| | | | | 359/487.02 |

\* cited by examiner

COMPENSATION FILM AND OPTICAL FILM AND DISPLAY DEVICE

CROSS-REFERENCE TO RELATED APPLICATION

This application claims priority to of Korean Patent Application No. 10-2016-0002268 filed in the Korean Intellectual Property Office on Jan. 7, 2016, and all the benefits accruing therefrom under 35 U.S.C. § 119, the content of which is incorporated herein in its entirety by reference.

BACKGROUND

1. Field

A compensation film, an optical film, and a display device are disclosed.

2. Description of the Related Art

Commonly used flat panel displays may be classified into a light-emitting display device emitting light by itself and a non-emissive display device requiring a separate light source, wherein a compensation film or an optical film may be employed for improving the image quality thereof. There remains a need in novel polymers, which can improve the properties of the existing compensation and optical films.

SUMMARY

An embodiment provides a compensation film having small changes of optical properties by an external force.

Another embodiment provides an optical film including the compensation film.

Yet another embodiment provides a display device including the compensation film or the optical film.

According to an embodiment, a compensation film includes a polymer having a first structural unit represented by Chemical Formula 1, and has a photoelastic coefficient of less than or equal to about $40 \times 10^{-13}$ cm$^2$/dyn.

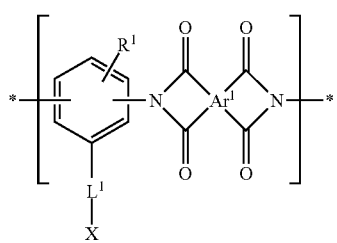

Chemical Formula 1

In Chemical Formula 1,

Ar$^1$ is a substituted or unsubstituted C6 to C30 arylene group,

X is a functional group including a substituted or unsubstituted C2 to C20 acetylenyl group, a substituted or unsubstituted C6 to C30 aryl group, or a cyano group, L$^1$ is a single bond, O, C(=O), C(=O)O, or C(=O)NR$^a$, and R$^1$ and R$^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The first structural unit may be represented by Chemical Formula 2 or 3.

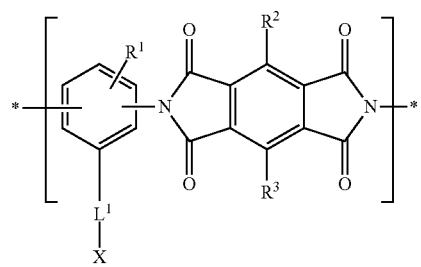

Chemical Formula 2

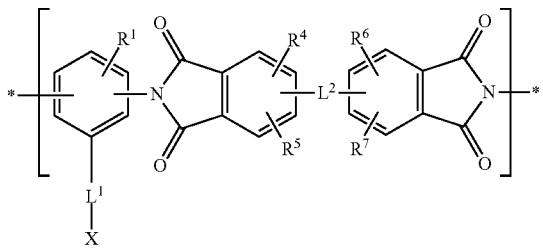

Chemical Formula 3

In Chemical Formulae 2 and 3,

X is a functional group including a substituted or unsubstituted C2 to C20 acetylenyl group, a substituted or unsubstituted C6 to C30 aryl group, or a cyano group, L$^1$ is a single bond, O, C(=O), C(=O)O, or C(=O)NR$^a$, L$^2$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^b$, SiR$^c$R$^d$, S, SO$_2$, or a combination thereof, and R$^1$ to R$^7$ and R$^a$ to R$^d$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The first structural unit may be represented by Chemical Formula 2a or 3a.

Chemical Formula 2a

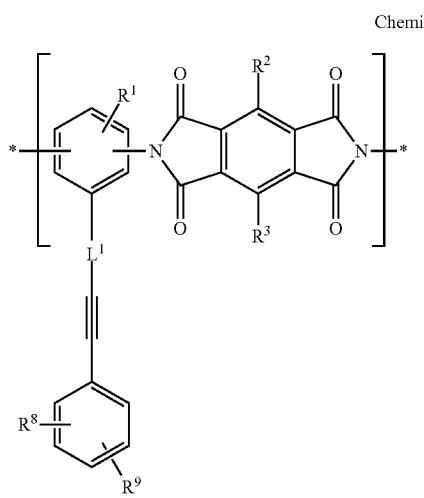

Chemical Formula 3a

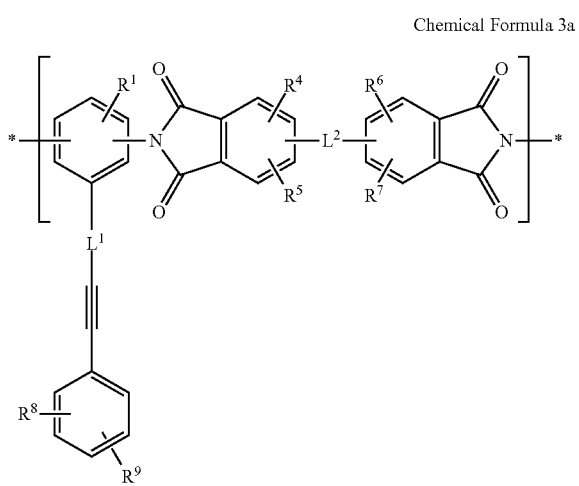

In Chemical Formulae 2a and 3a,

X is a functional group including a substituted or unsubstituted C2 to C20 acetylenyl group, a substituted or unsubstituted C6 to C30 aryl group, or a cyano group, $L^1$ is a single bond, O, C(=O), C(=O)O, or C(=O)NR$^a$, $L^2$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^b$, SiR$^c$R$^d$, S, SO$_2$, or a combination thereof, and $R^1$ to $R^9$ and $R^a$ to $R^d$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The polymer may further include a second structural unit represented by Chemical Formula 4 or 5.

Chemical Formula 4

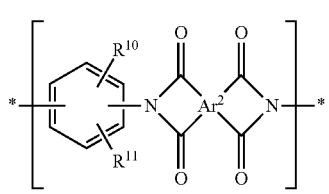

Chemical Formula 5

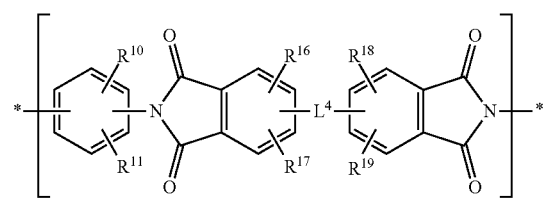

In Chemical Formulae 4 and 5, $Ar^2$ is a substituted or unsubstituted C6 to C30 arylene group, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, S, SO$_2$, or a combination thereof, and $R^{10}$ to $R^{13}$ and $R^e$ to $R^g$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit represented by Chemical Formula 4 may be represented by Chemical Formula 4a or 4b.

Chemical Formula 4a

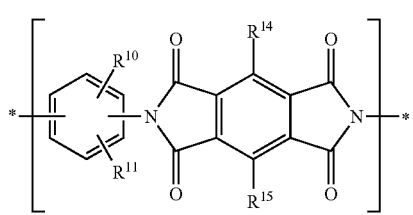

Chemical Formula 4b

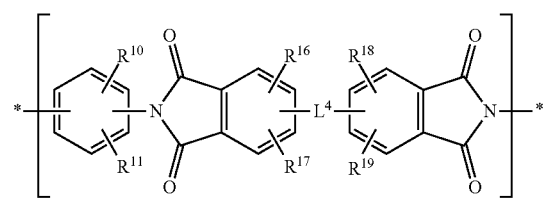

In Chemical Formulae 4a and 4b, $L^4$ are independently a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, $R^{10}$, $R^{11}$, $R^{14}$ to $R^{19}$, and $R^h$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit represented by Chemical Formula 5 may be represented by Chemical Formula 5a or 5b.

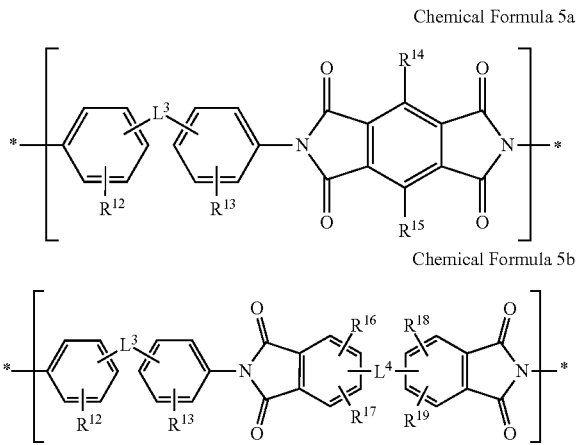

Chemical Formula 5a

Chemical Formula 5b

In Chemical Formulae 5a and 5b, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, SiR$^f$R$^g$, S, SO$_2$, or a combination thereof, $L^4$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, and $R^{12}$ to $R^{19}$ and $R^e$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The mole ratio of the first structural unit and the second structural unit may be about 1:99 to about 99:1.

The mole ratio of the first structural unit and the second structural unit may be about 20:80 to about 50:50.

The compensation film may be elongated in a uniaxial or biaxial direction.

The compensation film may be about 1.01 times to about 5.00 times elongated.

An in-plane retardation at a 550 nanometer wavelength of the compensation film may range from about 10 nanometers to about 300 nanometers.

The compensation film may have a photoelastic coefficient of about $5\times10^{-13}$ square centimeters per dyne to about $40\times10^{-13}$ square centimeters per dyne.

The compensation film may have a photoelastic coefficient of less than or equal to about $30\times10^{-13}$ square centimeters per dyne.

The compensation film may have a photoelastic coefficient of about $5\times10^{-13}$ square centimeters per dyne to about $30\times10^{-13}$ square centimeters per dyne.

A glass transition temperature of the compensation film may be greater than or equal to about 300° C.

According to another embodiment, an optical film including the compensation film and a polarizer is provided.

The polarizer may be a melt-blend of a hydrophobic polymer and a dichroic dye.

According to another embodiment, a display device including the compensation film or the optical film is provided.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
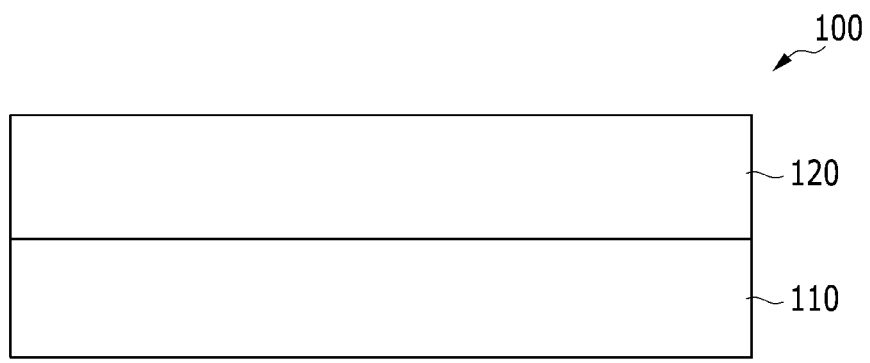
FIG. 1 is a schematic cross-sectional view showing an optical film according to an embodiment.

Exemplary embodiments will hereinafter be described in detail, and may be easily performed by those who have common knowledge in the related art. However, this disclosure may be embodied in many different forms and is not construed as limited to the exemplary embodiments set forth herein.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when specific definition is not otherwise provided, the term "substituted" refers to a group or atom substituted with a substituent selected from a halogen atom, a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxyl group, or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, instead of hydrogen of a compound or a functional group.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkoxy group" refers to "alkyl-O—", wherein the term "alkyl" has the same meaning as described above.

As used herein, when a definition is not otherwise provided, the term "cycloalkyl group" refers to a monovalent group having one or more saturated rings in which all ring members are carbon.

As used herein, when a definition is not otherwise provided, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, when a definition is not otherwise provided, the term "heterocyclic group" refers to a monovalent group having one or more saturated rings including one to three heteroatom ring members selected from the group consisting of N, O, S, Se, and P, wherein the remaining ring members are carbon.

As used herein, when a definition is not otherwise provided, the term "heterocyclic group" refers to a groups having formula —SiR$_3$, wherein R is each independently selected from an alkyl group and an aryl group as defined above.

As used herein, when a definition is not otherwise provided, the term "halogen" refers to fluorine, chlorine, bromine, and iodine.

As used herein, when a definition is not otherwise provided, the term "hydroxy group" refers to "—OH".

As used herein, when a definition is not otherwise provided, the term "nitro group" refers to "—NO$_2$".

As used herein, the term "alkylene group" refers to a straight or branched saturated aliphatic hydrocarbon group having a valence of at least two, optionally substituted with one or more substituents where indicated, provided that the valence of the alkylene group is not exceeded.

As used herein, the term "cycloalkylene group" refers to a cyclic hydrocarbon group having a valence of at least two, optionally substituted with one or more substituents where indicated, provided that the valence of the cycloalkylene group is not exceeded.

As used herein, when a definition is not otherwise provided, the term "arylene group" refers to a functional group having a valence of at least two obtained by removal of two hydrogens in an aromatic ring, optionally substituted with one or more substituents where indicated, provided that the valence of the alkylene group is not exceeded.

As used herein, the term "divalent heterocyclic group" refers to a cyclic group having a valence of at least two, optionally substituted with one or more substituents where indicated, and including one to three heteroatom ring members selected from the group consisting of N, O, S, Se, and P, wherein the remaining ring members are carbon, provided that the valence of the divalent heterocyclic group is not exceeded.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1-C30 alkyl" refers to a C1-C30 alkyl group substituted with C6-C30 aryl group, the total number of carbon atoms in the resulting aryl substituted alkyl group is C7-C60.

As used herein, when specific definition is not otherwise provided, the term "hetero" refers to one including 1 to 3 heteroatoms selected from N, O, S, Se, and P.

Hereinafter, a compensation film according to an embodiment is described.

A compensation film according to an embodiment includes a polymer having the following first structural unit.

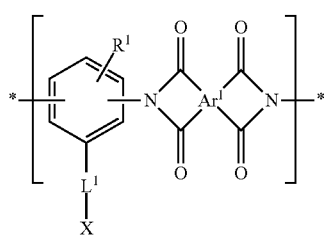

Chemical Formula 1

In Chemical Formula 1,

Ar$^1$ is a substituted or unsubstituted C6 to C30 arylene group,

X is a functional group including a substituted or unsubstituted C2 to C20 acetylenyl group, a substituted or unsubstituted C6 to C30 aryl group, or a cyano group, L$^1$ is a single bond, O, C(=O), C(=O)O, or C(=O)NR$^a$, and R$^1$ and R$^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The polymer includes a first structural unit having a polyimide main chain and a polar functional group X in a substantially perpendicular direction to the polyimide main chain, which thereby may decrease or offset birefringence generated in the polyimide main chain direction and accordingly, control birefringence of the compensation film by adjusting a refractive index in a main chain direction and a refractive index in a side chain direction.

The first structural unit may be, for example, represented by Chemical Formula 2 or 3.

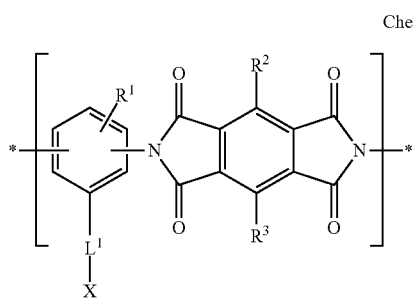

Chemical Formula 2

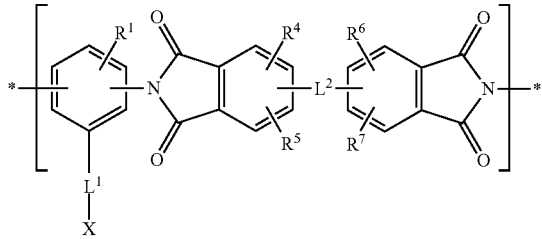

Chemical Formula 3

In Chemical Formulae 2 and 3,

X is a functional group including a substituted or unsubstituted C2 to C20 acetylenyl group, a substituted or unsubstituted C6 to C30 aryl group, or a cyano group, L$^1$ is a single bond, O, C(=O), C(=O)O, or C(=O)NR$^a$, L$^2$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^b$, SiR$^c$R$^d$, S, SO$_2$, or a combination thereof, R$^1$ to R$^7$ and R$^a$ to R$^d$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The first structural unit represented by Chemical Formula 2 may be, for example, represented by Chemical Formula 2a and the first structural unit represented by Chemical Formula 3 may be, for example, represented by Chemical Formula 3a.

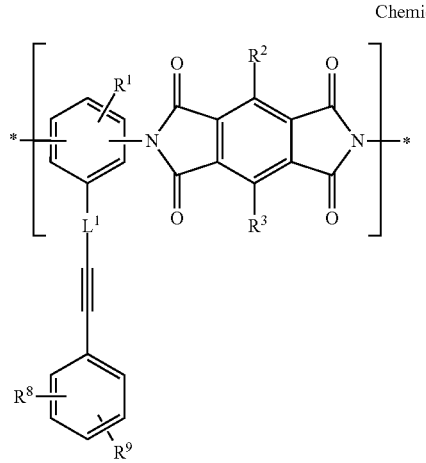

Chemical Formula 2a

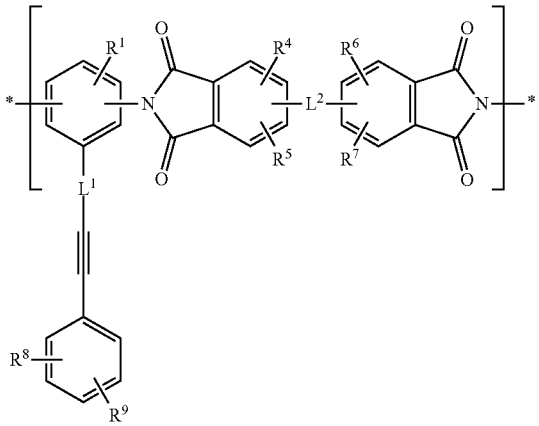

Chemical Formula 3a

In Chemical Formulae 2a and 3a,

X, L$^1$, L$^2$, and R$^1$ to R$^7$ are the same as described above,

R$^8$ and R$^9$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The polymer may further include a second structural unit, which is different from the first structural unit.

The second structural unit may be, for example, represented by Chemical Formula 4 or 5.

Chemical Formula 4

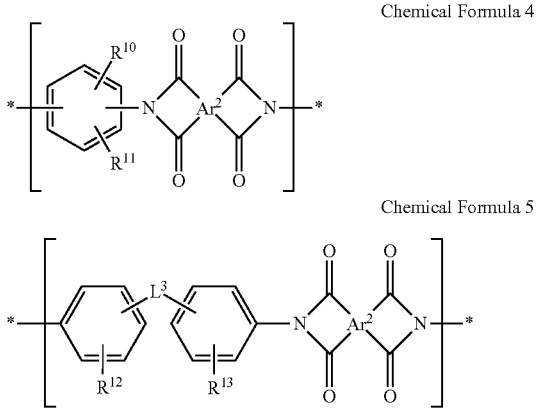

Chemical Formula 5

In Chemical Formulae 4 and 5, $Ar^2$ is a substituted or unsubstituted C6 to C30 arylene group, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, S, SO$_2$, or a combination thereof, and $R^{10}$ to $R^{13}$ and $R^e$ to $R^g$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit represented by Chemical Formula 4 may be, for example, represented by Chemical Formula 4a or 4b.

Chemical Formula 4a

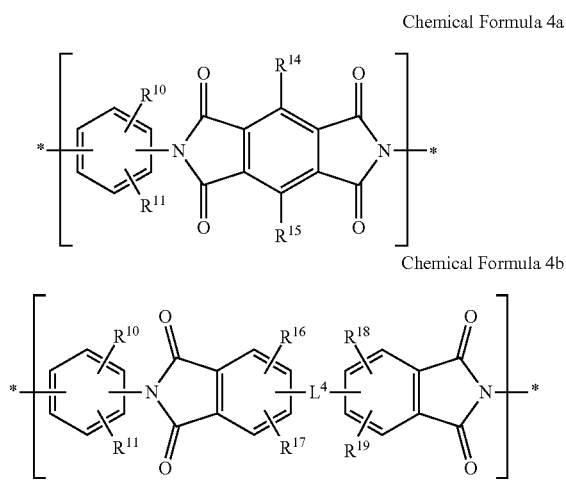

Chemical Formula 4b

In Chemical Formulae 4a and 4b, $L^4$ is independently a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, $R^{10}$, $R^{11}$, $R^{14}$ to $R^{19}$, and $R^h$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit represented by Chemical Formula 5 may be, for example, represented by Chemical Formula 5a or 5b.

Chemical Formula 5a

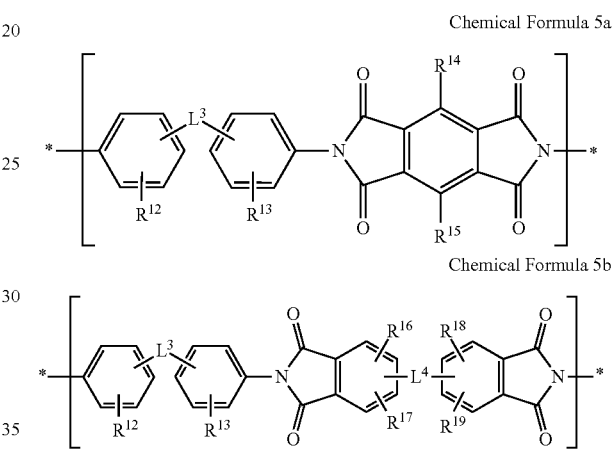

Chemical Formula 5b

In Chemical Formulae 5a and 5b, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, S, SO$_2$, or a combination thereof, $L^4$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, and $R^{12}$ to $R^{19}$ and $R^e$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

When the polymer includes the first structural unit and the second structural unit, the first structural unit and the second structural unit may be present in a mole ratio of about 1:99 to about 99:1. While not wishing to be bound by theory, it is understood that within the above range, flexibility may be improved, and the desirable optical properties may be obtained, and thus the polymer may be readily transformed into a film. Within the above range, the first and second structural units may be present in a mole ratio, for example, about 10:90 to about 90:10, about 10:90 to about 70:30, about 10:90 to about 50:50, or about 20:80 to about 50:50.

The compensation film may further include at least one additional polymer that is different from the above polymer. The compensation film may have further improved optical physical characteristics by including two or more polymer kinds. The additional polymer may be any polymer which is capable of improving a function of the compensation film, and is not particularly limited. The additional polymer may be, for example, a polymer having a polyimide main chain.

The compensation film may be, for example, elongated in a uniaxial or biaxial direction. For example, the compensation film may be elongated in a uniaxial direction, for example, the compensation film may be uniaxially elongated in a polyimide main chain direction.

The compensation film may have a photoelastic coefficient of less than or equal to about $40 \times 10^{-13}$ square centimeters per dyne ($cm^2/dyn$). Herein, the photoelastic coefficient indicates birefringence change of a transparent material depending on an external force when the external force (stress) is applied to the transparent material, and the birefringence change may be variously distributed depending on strength of the external force or a direction. In general, the birefringence change distribution depending on position of the transparent material may be examined through a color change when the external force is applied thereto with polarizers therebetween, and a photoelastic coefficient is obtained by measuring the birefringence change and finding its correlation with the external force.

The compensation film has a photoelastic coefficient within the above range, and thus may reduce a change in optical properties at a bent or folded place when bent or folded. Accordingly, the compensation film may be effectively applied to a flexible display device such as a foldable display device or a bendable display device. The optical properties may be examined by a reflectance change, a color change, a retardation change, and/or the like.

The compensation film may have, for example, a photoelastic coefficient of about $5 \times 10^{-13}$ $cm^2/dyn$ to about $40 \times 10^{-13}$ $cm^2/dyn$. The compensation film may have, for example, a photoelastic coefficient of less than or equal to about $30 \times 10^{-13}$ $cm^2/dyn$, for example, about $5 \times 10^{-13}$ $cm^2/dyn$ to about $30 \times 10^{-13}$ $cm^2/dyn$.

The compensation film may have a predetermined retardation by changing a refractive index and light absorption characteristics depending on a wavelength.

Retardation (R) of the compensation film may be expressed as an in-plane retardation ($R_o$) and a thickness direction retardation ($R_{th}$). The in-plane retardation ($R_o$) of the compensation film is a retardation generated in an in-plane direction of the compensation film and represented by $R_o=(n_x-n_y)d$. The thickness direction retardation ($R_{th}$) of the compensation film is a retardation of the compensation film generated in a thickness direction and represented by $R_{th}=\{[(n_x-n_y)/2]-n_z\}d$. Herein, $n_x$ is a refractive index in a direction having the highest refractive index in a plane of a compensation film (hereinafter referred to as "slow axis"), $n_y$ is a refractive index in a direction having the lowest refractive index in a plane of the compensation film (hereinafter referred to as "fast axis"), $n_z$ is a refractive index in a direction perpendicular to the slow axis and the fast axis of a compensation film, and d is a thickness of a compensation film.

The compensation film may have an in-plane retardation and a thickness direction retardation within a predetermined range by changing the $n_x$, $n_y$, $n_z$, and/or the thickness (d). For example, an in-plane retardation at a 550 nanometer (nm) wavelength of the compensation film ($R_o$) may range from about 10 nanometers (nm) to about 300 nm.

The compensation film may have, for example, a glass transition temperature of greater than or equal to about 300° C., for example, about 300° C. to about 400° C.

The compensation film may have a relatively low thickness. The compensation film may have, for example, a thickness of about 3 micrometers (μm) to about 200 μm, for example, about 5 μm to about 150 μm, or about 5 μm to about 100 μm.

The compensation film may include a substantially transparent polymer and may be used as a substrate, and accordingly, a separate substrate may be omitted beneath the compensation film. Accordingly, the compensation film according to an embodiment may be much thinner than the conventional compensation film. The compensation film may be effectively applied to a flexible display device such as a foldable display device or a bendable display device, and thus may have improved optical properties and display characteristics.

The compensation film may be prepared, for example, by providing at least one anhydride compound and at least one diamine compound, polymerizing the anhydride compound and the diamine compound to prepare a polymer, transforming the polymer into a film, and elongating the film.

The anhydride may be, for example, represented by Chemical Formula A.

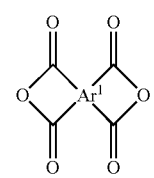

Chemical Formula A

In Chemical Formula A, $Ar^1$ is the same as described above.

The anhydride may be, for example, represented by A-1 or A-2.

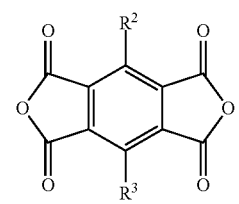

Chemical Formula A-1

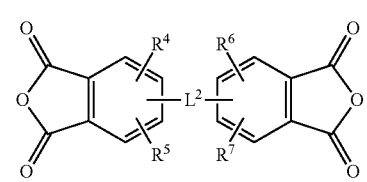

Chemical Formula A-2

In Chemical Formula A-1 or A-2, $L^2$ and $R^2$ to $R^7$ are the same as described above.

The anhydride may be, for example, 2,3,3',4'-biphenyltetracarboxylic acid dianhydride, 2,3,3',4'-diphenylsulfone tetracarboxylic acid dianhydride, 3,4'-oxydiphthalic anhydride, 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA) and 4-(2,5-dioxotetrahydrofuran-3-yl)-1,2,3,4-tetrahydronaphthalene-1,2-dicarboxylic anhydride (DTDA), or a combination thereof, but is not limited thereto.

The diamine compound may include, for example, a first diamine compound and a second diamine compound.

The first diamine compound may be, for example, represented by Chemical Formula B.

Chemical Formula B

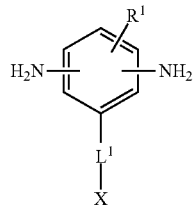

In Chemical Formula B, X, $L^1$, and $R^1$ are the same as described above.

The first diamine compound may be, for example, represented by Chemical Formula B-1.

Chemical Formula B-1

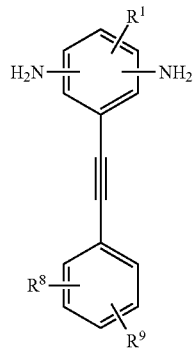

In Chemical Formula B-1, $R^1$, $R^8$, and $R^9$ are the same as described above.

The second diamine compound may be, for example, at least one of the compounds of Group 1.

Group 1

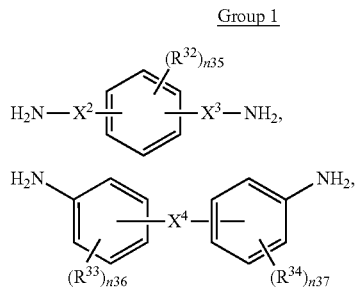

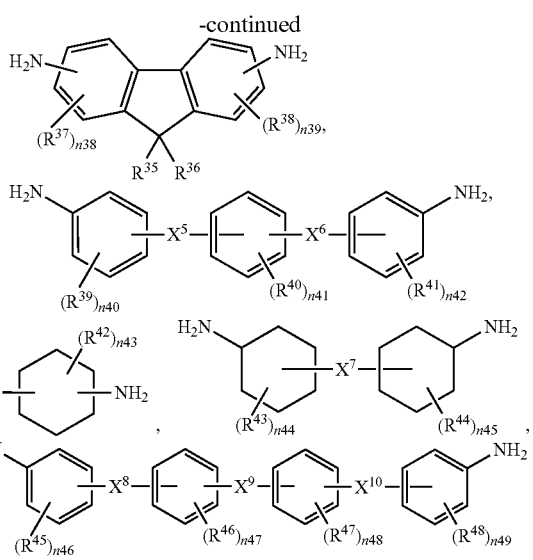

In Group 1, $R^{32}$ to $R^{48}$ are independently hydrogen, a substituted or unsubstituted C1 to C20 alkyl group, a substituted or unsubstituted C1 to C20 alkoxy group, a substituted or unsubstituted C1 to C20 fluoroalkyl group, a substituted or unsubstituted C3 to C20 cycloalkyl group, a substituted or unsubstituted C3 to C20 heterocyclic group, a substituted or unsubstituted C3 to C20 oxycycloalkyl group, a substituted or unsubstituted C6 to C20 aryl group, a substituted or unsubstituted C6 to C20 oxyaryl group, a substituted or unsubstituted silyl group, a hydroxy group, a halogen, a nitro group, or a combination thereof, $X^2$ to $X^{10}$ are independently a single bond, a substituted or unsubstituted C1 to C20 alkylene group, a substituted or unsubstituted C1 to C20 cycloalkylene group, a substituted or unsubstituted C6 to C20 arylene group, a substituted or unsubstituted C3 to C20 divalent heterocyclic group, $SO_2$, O, C(=O), C(=O)O, groups listed in Group 2, or a combination thereof, n35 to n37 and n40 to n49 are independently an integer ranging from 0 to 4, and n38 and n39 are independently an integer ranging from 0 to 3.

Group 2

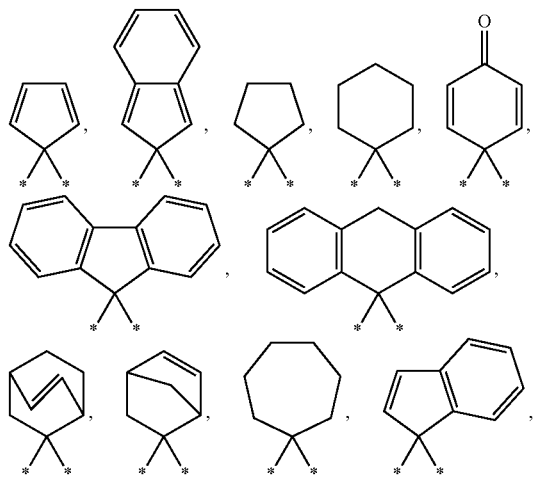

-continued
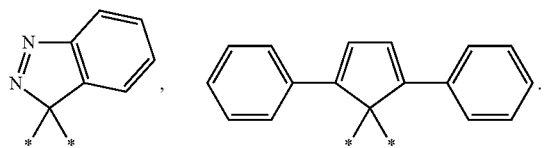
The second diamine compound may be, for example, at least one of the compounds of Group 3, but is not limited thereto.
Group 3
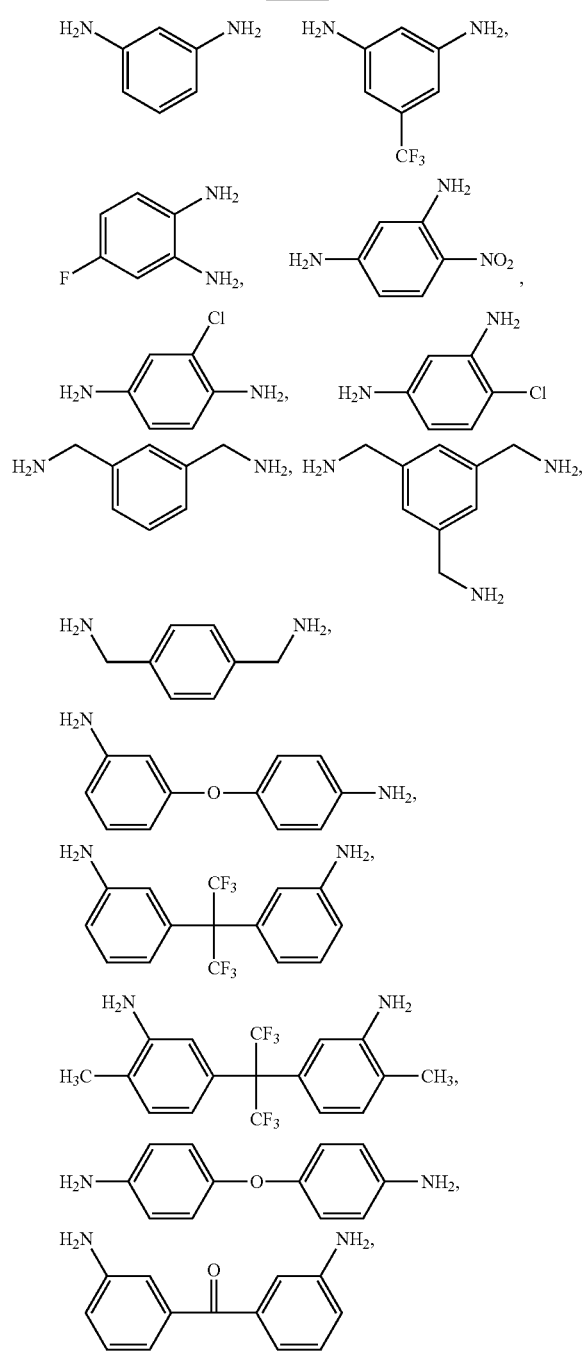
-continued
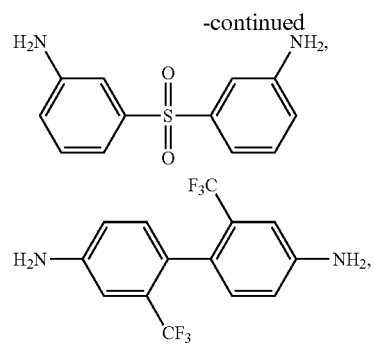
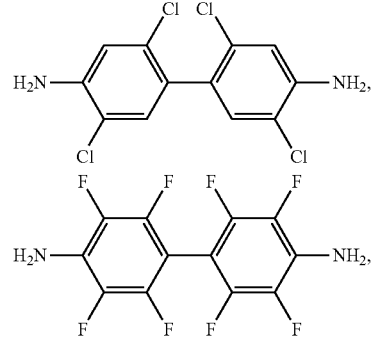
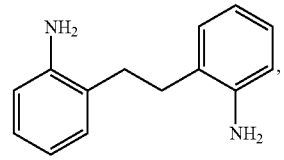
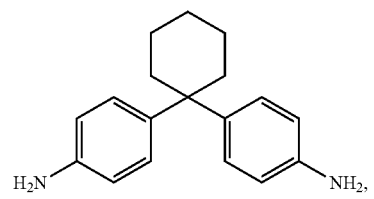
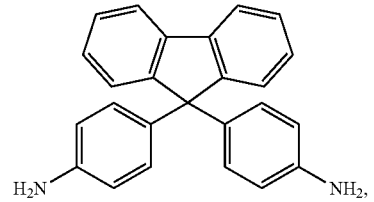
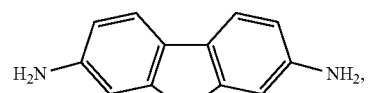
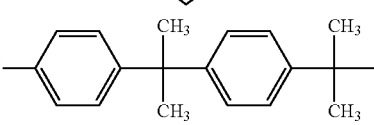
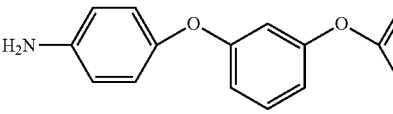
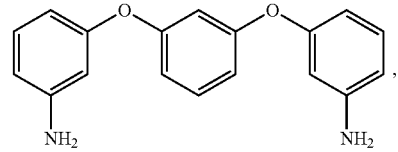

-continued

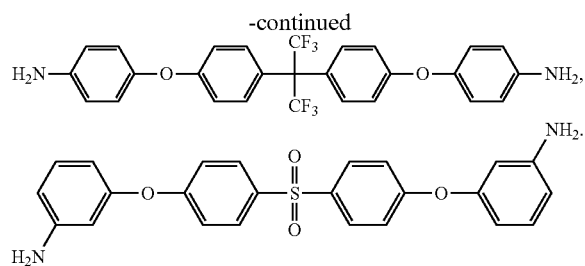

The first diamine compound and the second diamine compound may be, for example, present in a mole ratio of about 1:99 to about 99:1, about 10:90 to about 90:10, about 10:90 to about 70:30, about 10:90 to about 50:50, or about 20:80 to about 50:50.

The anhydride compound and the diamine compound may be, for example, included in a mole ratio of about 1:9 to about 9:1, for example, about 3:7 to about 7:3, and in another example, about 5:5.

The polymer may be prepared by a known polyimide synthesis method using a composition including the anhydride compound, the diamine compound, and a solvent. The solvent may be, for example, an aprotic polar solvent, for example, a sulfoxide-containing solvent such as dimethylsulfoxide and diethylsulfoxide, a formamide-containing solvent such as N,N-dimethylformamide and N,N-diethylformamide, an acetamide-containing solvent such as N,N-dimethylacetamide, N,N-di methylmethoxyacetamide, and N,N-diethylacetamide, a pyrrolidone-containing solvent such as N-methyl-2-pyrrolidone (NMP), N-acetyl-2-pyrrolidone, and N-vinyl-2-pyrrolidone, a halogenated phenol such as o-cresol, m-cresol, p-cresol, and xylenol, and a phenol-containing solvent such as catechol, hexamethylphosphor amide, γ-butyrolactone, tetrahydrothiophene dioxide, N-methyl-δ-caprolactam, N,N,N',N'-tetramethylurea, or a mixture thereof, but is not limited thereto.

The polymer may be, for example, prepared into a film by placing a melt polymer into a mold and pressing the same with a high pressure machine or discharging the same into a chill roll through a T-die.

The polymer may be, for example, prepared into a film by coating a polymer solution on a substrate and then curing the film, wherein the coating may use, for example, spin coating, slit coating, Inkjet coating, dip coating, etc. The curing may be, for example, performed at about 50° C. to about 120° C., but is not limited thereto.

The elongating of the film may be performed by elongating at a temperature of a glass transition temperature ±50° C., for example, at a temperature of about 50° C. to about 500° C. at an elongation rate of about 1.01 times to about 5.00 times. The elongation rate refers to a length rate of after elongating the film to before the elongation, which indicates how much the film is stretched after performing the elongation in a uniaxial direction.

The compensation film may be used alone or together with another compensation film.

The compensation film may be used with a polarization film to provide an optical film for preventing reflection of external light in a display device. The optical film may be, for example, an antireflective film, but is not limited thereto.

Figure 2:
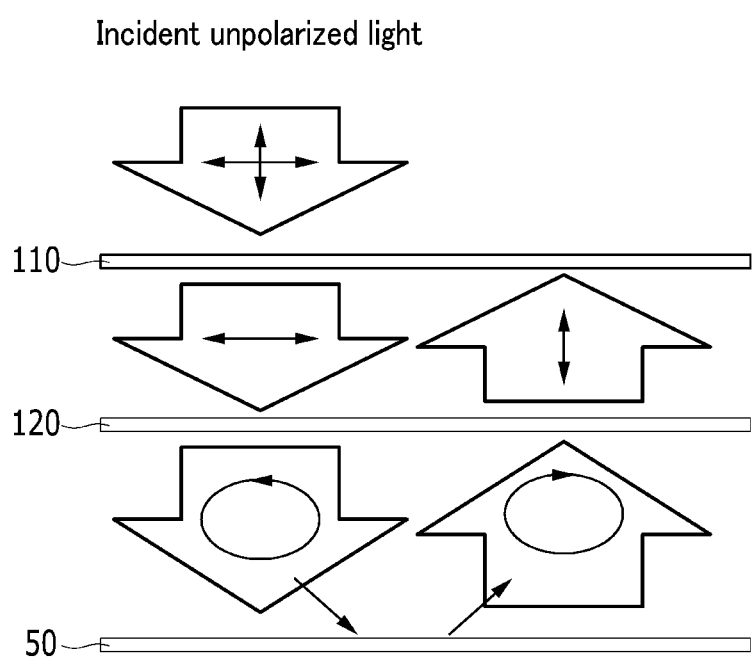
FIG. 2 is a schematic view showing the external light anti-reflection principle of an optical film according to an embodiment.

FIG. 1 is a schematic cross-sectional view of an optical film according to an embodiment, and FIG. 2 is a schematic view showing the external light anti-reflection principle of an optical film according to an embodiment.

Referring to FIG. 1, an optical film 100 according to an embodiment includes a polarizer 110 and a compensation film 120.

The polarizer 110 is not particularly limited if incident unpolarized light is polarized and may be, for example, a polyvinyl alcohol (PVA) including an iodine and/or a dichroic dye. The polarizer 110 may be, for example, an elongated film.

The polarizer 110 may be, for example, a polarizing film including a polymer and a dichroic dye. The polymer may be, for example, a hydrophobic polymer, and may include, for example, polyolefin. The polarizer 110 may be a self-integrated elongation film made of, for example, a melt-blend of polyolefin and a dichroic dye. The polyolefin may be elongated in a uniaxial direction, wherein the uniaxial direction may be the same as a length direction of the dichroic dye. The dichroic dye may be dispersed in the polyolefin, and may be uniaxially aligned in the elongation direction of the polyolefin. The dichroic dye may transmit one perpendicular polarization component of two perpendicular polarization components in a predetermined wavelength region. The dichroic dye may be included in an amount of about 0.01 to about 5 parts by weight based on 100 parts by weight of the polyolefin. While not wishing to be bound by theory, it is understood that within the above range, sufficient polarization characteristics may be obtained without deteriorating transmittance of a polarization film. Within the above range, the dichroic dye may be included in an amount of about 0.05 to about 1 part by weight based on 100 parts by weight of the polyolefin.

The polarizer 110 may have a relatively low thickness of less than or equal to about 100 μm, for example, less than or equal to about 50 μm, for example, about 10 μm to about 50 μm.

The compensation film 120 is the same as described above.

The compensation film 120 circularly polarizes light passing the polarizer 110, and generates retardation, and may have an effect on reflection and/or absorption of light.

For example, the optical film 100 is disposed at one side or both sides of a display device, and particularly on the screen side of the display device, and thus may prevent reflection of light flowing in from the outside (hereinafter referred to as "reflection of external light"). Therefore, the optical film 100 may prevent visibility deterioration due to the reflection of external light.

FIG. 2 is a schematic view showing the external light anti-reflection principle of an optical film according to an embodiment.

Referring to FIG. 2, while the incident unpolarized light having entered from the outside is passed through the polarizer 110, and the polarized light is shifted into circularly polarized light by passing through the compensation film 120, only a first polarized perpendicular component, which is one polarized perpendicular component of two polarized perpendicular components, is transmitted. While the circularly polarized light is reflected in a display panel 50 including a substrate, an electrode, and so on, is changed in the circular polarization direction, and is passed through the compensation film 120 again, only a second polarized perpendicular component, which is the other polarized perpendicular component of the two polarized perpendicular components, may be transmitted. As the second polarized perpendicular component is not passed through the polarization film 110, and light does not exit to the outside, an effect of preventing the external light reflection may be provided.

The optical film 100 may further include a correction layer (not shown) positioned on one side of the compensation film 120. The correction layer may be, for example, a color shift resistant layer, but is not limited thereto.

The optical film 100 may further include a light blocking layer (not shown) extended along the edge. The light blocking layer may be formed in a strip along the circumference of the optical film 100, and for example, may be positioned between the polarizer 110 and the compensation film 120. The light blocking layer may include an opaque material, for example, a black material. For example, the light blocking layer may be made of a black ink.

The compensation film or the optical film 100 may be applied to various display devices.

A display device according to an embodiment includes a display panel and the compensation film or the optical film positioned on one side of the display panel. The display panel may be a liquid crystal panel or an organic light emitting panel, but is not limited thereto.

Hereinafter, an organic light emitting display is described as an example of a display device.

Figure 3:
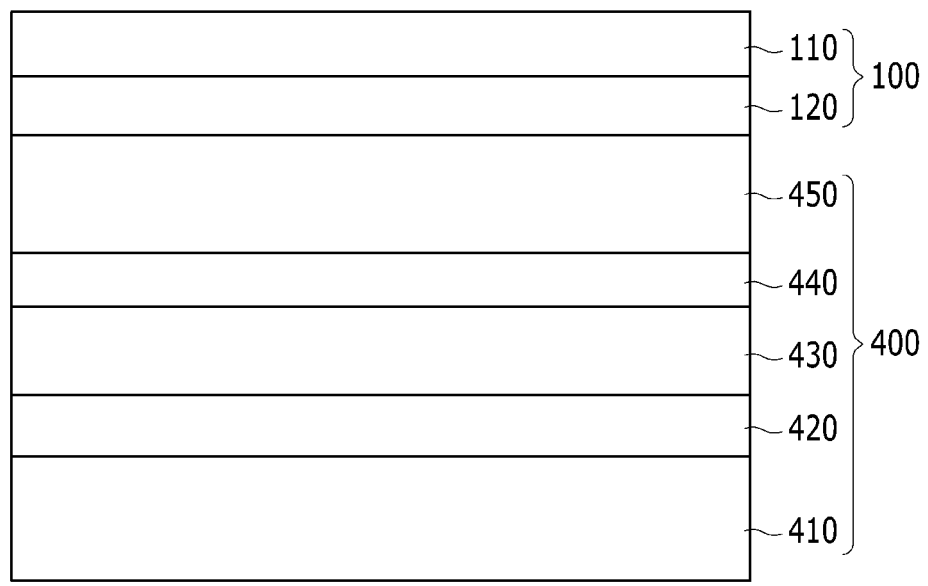
FIG. 3 is a schematic cross-sectional view showing an organic light emitting display according to an embodiment.

FIG. 3 is a schematic cross-sectional view showing an organic light emitting display according to an embodiment.

Referring to FIG. 3, an organic light emitting display according to an embodiment includes an organic light emitting panel 400 and the compensation film or the optical film 100 positioned on one side of the organic light emitting panel 400.

The organic light emitting panel 400 may include a base substrate 410, a lower electrode 420, an organic emission layer 430, an upper electrode 440, and an encapsulation substrate 450.

The base substrate 410 may be made of glass or plastic.

At least one of the lower electrode 420 and the upper electrode 440 may be an anode, and the other may be a cathode. The anode is an electrode injected with holes, and may be made of a transparent conductive material having a high work function to transmit the emitted light to the outside, for example, ITO or IZO. The cathode is an electrode injected with electrons, and may be made of a conductive material having a low work function without affecting the organic material, and may be selected from, for example, aluminum (Al), calcium (Ca), and barium (Ba).

The organic emission layer 430 includes an organic material which may emit light when a voltage is applied to the lower electrode 420 and the upper electrode 440.

The organic emission layer 430 includes an organic material which may emit light when a voltage is applied to the lower electrode 420 and the upper electrode 440. An auxiliary layer (not shown) may be further provided between the lower electrode 420 and the organic emission layer 430 and between the upper electrode 440 and the organic emission layer 430.

The encapsulation substrate 450 may be made of glass, metal, or a polymer, and may seal the lower electrode 420, the organic emission layer 430, and the upper electrode 440 to prevent moisture and/or oxygen inflow from the outside.

The optical film 100 may be disposed on the light-emitting side. For example, when a bottom emission structure emits light at the side of the base substrate 410, the optical film 100 may be disposed on the exterior side of the base substrate 410, while when a top emission structure emits light at the side of the encapsulation substrate 450, the optical film 100 may be disposed on the exterior side of the encapsulation substrate 450.

The optical film 100 is the same as described above. In the drawing, an example for application of the optical film 100 is illustrated, but the compensation film may be applied instead of the optical film 100.

Hereinafter, a liquid crystal display device is described as an example of the display device.

Figure 4:
FIG. 4 is a schematic cross-sectional view showing a liquid crystal display (LCD) device according to an embodiment.

FIG. 4 is a schematic cross-sectional view showing a liquid crystal display device according to an embodiment.

Referring to FIG. 4, a liquid crystal display device according to an embodiment includes a liquid crystal panel 500 and the optical film 100 positioned on one side of the liquid crystal panel 500.

The liquid crystal panel 500 may be a twist nematic (TN) mode panel, a patterned vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together therewith.

The liquid crystal layer 530 may include a plurality of liquid crystal molecules. The liquid crystal molecules may have positive or negative dielectric anisotropy. When the liquid crystal molecules have positive dielectric anisotropy, the major axes thereof may be aligned substantially parallel to the surface of the first display panel 510 and the second display panel 520 when an electric field is not applied, and the major axes may be aligned substantially perpendicular to the surface of the first display panel 510 and second display panel 520 when an electric field is applied. On the other hand, when the liquid crystal molecules have negative dielectric anisotropy, the major axes may be aligned substantially perpendicular to the surface of the first display panel 510 and the second display panel 520 when an electric field is not applied, and the major axes may be aligned substantially parallel to the surface of the first display panel 510 and the second display panel 520 when an electric field is applied.

The optical film 100 may be disposed on the outside of the liquid crystal panel 500. Although the optical film 100 is shown to be provided on both the lower part and the upper part of the liquid crystal panel 500 in the drawing, it is not limited thereto, and the optical film may be formed on only one of the lower part and the upper part of the liquid crystal panel 500. In the drawing, an example for application of the optical film 100 is illustrated, but the compensation film may be applied instead of the optical film 100.

Hereinafter, the present disclosure is illustrated in more detail with reference to examples. However, these examples are exemplary, and the present disclosure is not limited thereto.

EXAMPLES

Preparation of Compensation Film

Example 1

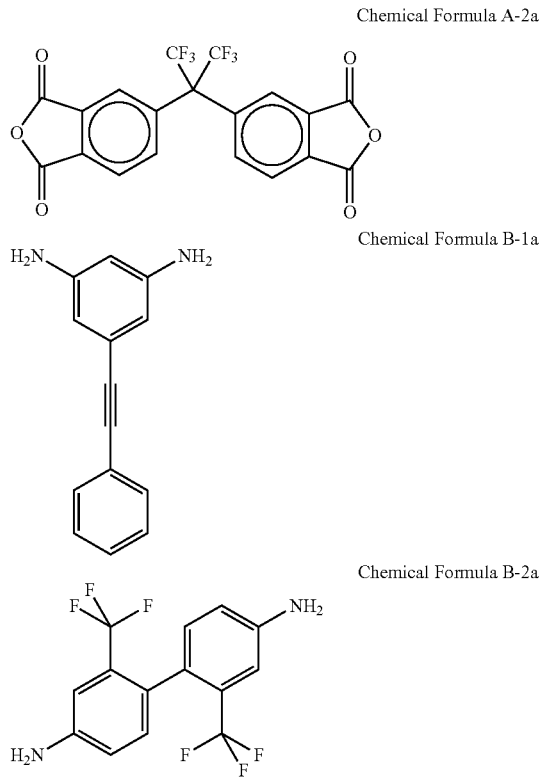

Chemical Formula A-2a

Chemical Formula B-1a

Chemical Formula B-2a 0.857 grams (g) (2.6 millimoles (mmol)) of 5-(phenylethynyl)benzene-1,3-diamine (R1) represented by Chemical Formula B-1a and 3.344 g (10.4 mmol) of 2,2'-bis(trifluoromethyl)-4,4'-diaminobiphenyl (TFDB) represented by Chemical Formula B-2a (a mole ratio of 2:8) are dissolved in 50 ml of dimethylacetamide (DMAc), to prepare a transparent solution. Subsequently, 5.80 g (13.1 mmol) of 4,4'-(hexafluoroisopropylidene)diphthalic anhydride (6FDA) represented by Chemical Formula A-2a is dissolved in the transparent solution, and the obtained solution is allowed to stand at room temperature for 48 hours under nitrogen atmosphere. When the reaction is complete, the resultant is spin-coated on a glass plate having a size of 2×25 square centimeters ($cm^2$) and dried for 2 hours in an 80° C. oven. Then, the dried composition is heated up at 10 degrees Centigrade per minute (° C./min) in an oven under a nitrogen atmosphere and imidized at 300° C. for 1 hour, forming a film. The film has an average thickness of 20 μm. Subsequently, the film is elongated at 300° C. at an elongation rate of 104%, manufacturing a compensation film.

Example 2

A compensation film is manufactured according to the same method as Example 1 except for using the diamine compound represented by Chemical Formula B-1a and the diamine compound represented by Chemical Formula B-2a in a mole ratio of 3:7.

Example 3

A compensation film is manufactured according to the same method as Example 1 except for using the diamine compound represented by Chemical Formula B-1a and the diamine compound represented by Chemical Formula B-2a in a mole ratio of 4:6.

Example 4

A compensation film is manufactured according to the same method as Example 1 except for using the diamine compound represented by Chemical Formula B-1a and the diamine compound represented by Chemical Formula B-2a in a mole ratio of 5:5.

Comparative Example 1

A compensation film is manufactured according to the same method as Example 1 except for using only the diamine compound represented by Chemical Formula B-2a in an amount of 1.45 g (13.4 moles (mol)) of instead of the diamine compound represented by Chemical Formula B-1a and the diamine compound represented by Chemical Formula B-2a.

Example 5

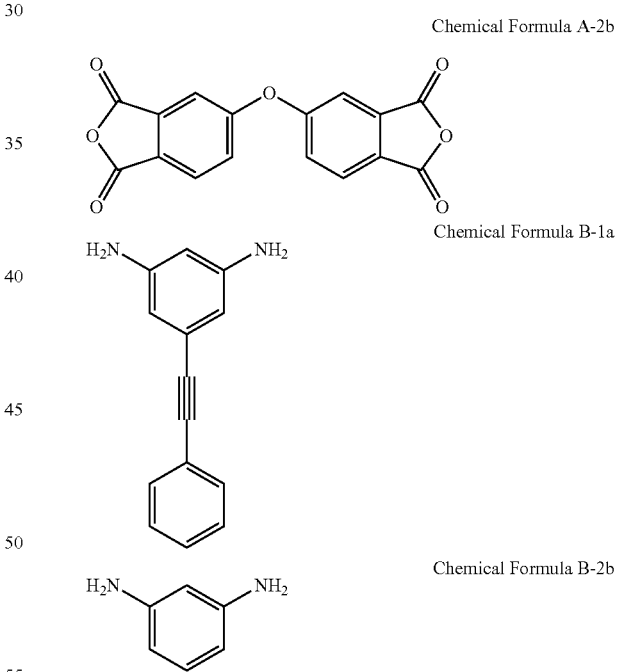

Chemical Formula A-2b

Chemical Formula B-1a

Chemical Formula B-2b

A transparent solution is prepared by dissolving 3.10 g (9.5 mmol) of 5-(phenylethynyl)benzene-1,3-diamine (R1) represented by Chemical Formula B-1a and 1.02 g (9.5 mmol) of m-phenylenediamine (mPDA) represented by Chemical Formula B-2b (a mole ratio of 5:5) in 50 ml of dimethylacetamide (DMAc). Subsequently, 5.87 g (18.9 mmol) of 4,4'-oxydiphthalic anhydride (ODPA) represented by Chemical Formula A-2b is dissolved in the transparent solution, and the obtained solution is allowed to stand for 48 hours at room temperature under nitrogen atmosphere. When the reaction is complete, the resultant is spin-coated on a glass plate having a size of 2×25 cm² and dried in an 80° C. oven for 2 hours. Then, the dried composition is heated at 10° C./min in an oven under a nitrogen atmosphere and imidized at 300° C. for 1 hour, to form a film. The film has an average thickness of 20 μm. Subsequently, the film is elongated at 300° C. at an elongation rate of 104%, to manufacture a compensation film.

Example 6

A compensation film is manufactured according to the same method as Example 5 except for using the diamine compound represented by Chemical Formula B-1a and the diamine compound represented by Chemical Formula B-2b in a mole ratio of 7:3.

Comparative Example 2

A compensation film is manufactured according to the same method as Example 5 except for using only the diamine compound represented by Chemical Formula B-2b in an amount of 2.58 g (23.9 mmol) instead of the diamine compound represented by Chemical Formula B-1a and the diamine compound represented by Chemical Formula B-2b.

Example 7

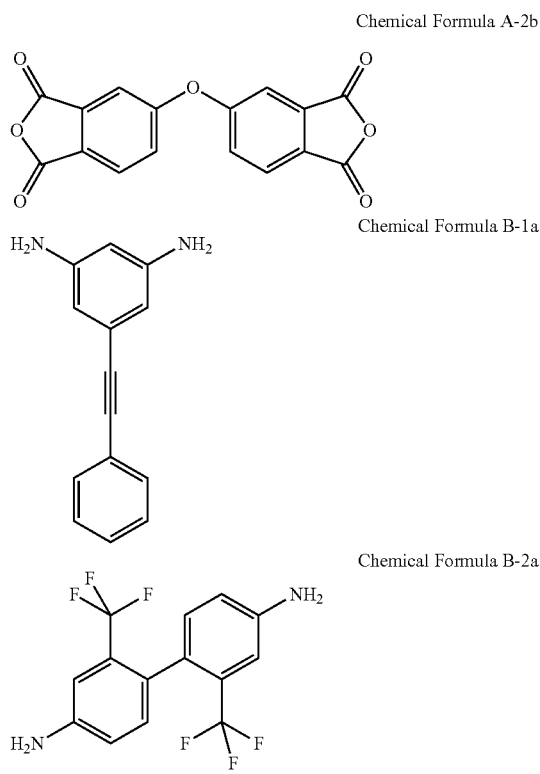

Chemical Formula A-2b

Chemical Formula B-1a

Chemical Formula B-2a

A transparent solution is prepared by dissolving 0.52 g (1.6 mmol) of 5-(phenylethynyl)benzene-1,3-diamine (R1) represented by Chemical Formula B-1a and 4.57 g (14.3 mmol) of 2,2'-bis(trifluoromethyl)-4,4'-diaminobiphenyl (TFDB) represented by Chemical Formula B-2a (1:9 of a mole ratio) in 50 ml of dimethylacetamide (DMAc). Subsequently, 4.91 g (15.8 mmol) of 4,4'-oxydiphthalic anhydride (ODPA) represented by Chemical Formula A-2b is dissolved in the transparent solution, and the obtained solution is allowed to stand for 48 hours at room temperature in a nitrogen state. When the reaction is complete, the resultant is spin-coated on a glass plate having a size of 2×25 cm² and dried in an 80° C. oven for 2 hours. Then, the dried composition is put in an oven under a nitrogen atmosphere, heated up at 10° C./min, and imidized at 300° C. for 1 hour, forming a film. The film has an average thickness of 20 μm. Subsequently, the film is elongated at 300° C. at an elongation rate of 104%, manufacturing a compensation film.

Example 8

A compensation film is manufactured according to the same method as Example 7 except for using the diamine compound represented by Chemical Formula B-1a and the diamine compound represented by Chemical Formula B-2a in a mole ratio of 2:8.

Example 9

A compensation film is manufactured according to the same method as Example 7 except for using the diamine compound represented by Chemical Formula B-1a and the diamine compound represented by Chemical Formula B-2a in a mole ratio of 5:5.

Comparative Example 3

A compensation film is manufactured according to the same method as Example 7 except for using only the diamine compound represented by Chemical Formula B-2a in an amount of 5.08 g (15.9 mol) instead of the diamine compound represented by Chemical Formula B-1a and the diamine compound represented by Chemical Formula B-2a in a mole ratio of 5:5.

Evaluation

Evaluation 1

Photoelastic coefficient of the compensation films according to Examples 1 to 9 and Comparative Examples 1 to 3 is evaluated.

The photoelastic coefficient is measured by using KOBRA equipment (KOBRA-WPR, Oji Scientific Instrument). Specifically, the compensation film is fixed at one end of the KOBRA equipment, and a weight is hung at the other end, and an in-plane retardation slope is measured by increasing the weight. The obtained slope is converted into a photoelastic coefficient through Calculation Equation.

Photoelastic coefficient(cm²/dyn)=slope×1.5×10⁻³  Calculation Equation

The results are provided in Tables 1 to 3.

TABLE 1

| | R1:TFDB:6FDA (mole ratio) | Photoelastic coefficient ($10^{-13}$ cm²/dyn) |
|---|---|---|
| Example 1 | 2:8:10 | 29.58 |
| Example 2 | 3:7:10 | 28.47 |
| Example 3 | 4:6:10 | 23.18 |
| Example 4 | 5:5:10 | 24.76 |
| Comparative Example 1 | 0:10:10 | 42.99 |

Referring to Table 1, the compensation films according to Examples 1 to 4 exhibit a much deteriorated photoelastic coefficient compared to the compensation film according to Comparative Example 1. Specifically, the compensation films according to Examples 1 to 4 satisfy a photoelastic coefficient of less than or equal to about 40×10⁻¹³ cm²/dyn.

TABLE 2

|  | R1:mPDA:ODPA (mole ratio) | Photoelastic coefficient ($10^{-13}$ cm$^2$/dyn) |
|---|---|---|
| Example 5 | 5:5:10 | 27.47 |
| Example 6 | 7:3:10 | 31.37 |
| Comparative Example 2 | 0:10:10 | 53.21 |

Referring to Table 2, the compensation films according to Examples 5 and 6 exhibit a much deteriorated photoelastic coefficient compared to the compensation film according to Comparative Example 2. Specifically, the compensation films according to Examples 5 and 6 satisfy a photoelastic coefficient of less than or equal to about $40 \times 10^{-13}$ cm$^2$/dyn.

TABLE 3

|  | R1:TFDB:ODPA (mole ratio) | Photoelastic coefficient ($10^{-13}$ cm$^2$/dyn) |
|---|---|---|
| Example 7 | 1:9:10 | 34.34 |
| Example 8 | 2:8:10 | 30.30 |
| Example 9 | 5:5:10 | 22.16 |
| Comparative Example 3 | 0:10:10 | 53.03 |

TABLE 4

|  | Thickness (μm) | In-plane retardation ($R_o$, nm) | Thickness direction retardation ($R_{th}$, nm) |
|---|---|---|---|
| Example 1 | 24 | 189.38 | 110.87 |
| Example 2 | 22 | 113.37 | 72.88 |
| Example 3 | 23 | 105.6 | 65.32 |
| Example 4 | 18 | 20.78 | 13.35 |

Referring to Table 3, the compensation films according to Examples 7 to 9 exhibit a much deteriorated photoelastic coefficient compared to the compensation film according to Comparative Example 3. Specifically, the compensation films according to Examples 7 to 9 satisfy a photoelastic coefficient of less than or equal to about $40 \times 10^{-13}$ cm$^2$/dyn.

Evaluation 2

Retardation of the compensation films according to Examples 1 to 4 is evaluated.

The retardation is measured as an in-plane retardation and a thickness direction retardation by using an Axoscan equipment (Axometrics, Inc.) in a wavelength range of 400 nm to 700 nm and adjusting an incident angle from −70° to 70° by every 5°.

The results are provided in Table 4.

Referring to Table 4, the compensation films according to Examples 1 to 4 has a predetermined in-plane retardation and thickness direction retardation.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A compensation film comprising a polymer comprising a first structural unit represented by Chemical Formula 1, and having a photoelastic coefficient of less than or equal to about $40 \times 10^{-13}$ square centimeters per dyne:

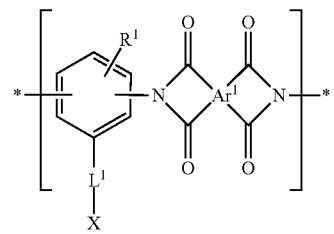

Chemical Formula 1 wherein, in Chemical Formula 1,
Ar$^1$ is a substituted or unsubstituted C6 to C30 arylene group,
X is a functional group including a substituted or unsubstituted C2 to C20 acetylenyl group, a substituted or unsubstituted C6 to C30 aryl group, or a cyano group,
L$^1$ is a single bond, O, C(=O), C(=O)O, or C(=O)NR$^a$, and
R$^1$ and R$^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

2. The compensation film of claim 1, wherein the first structural unit is represented by Chemical Formula 2 or 3:

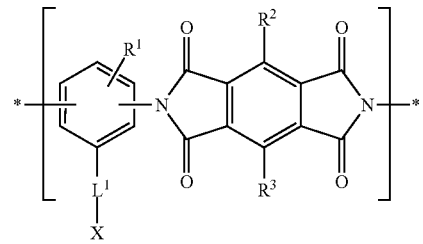

Chemical Formula 2

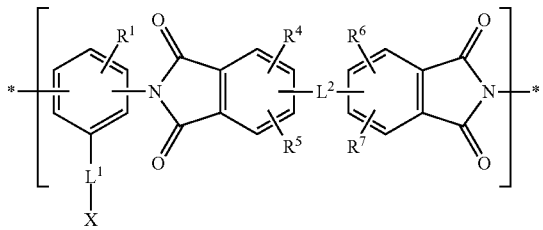

Chemical Formula 3 wherein, in Chemical Formulae 2 and 3,
X is a functional group including a substituted or unsubstituted C2 to C20 acetylenyl group, a substituted or unsubstituted C6 to C30 aryl group, or a cyano group,
L$^1$ is a single bond, O, C(=O), C(=O)O, or C(=O)NR$^a$,
L$^2$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^b$, SiR$^c$R$^d$, S, SO$_2$, or a combination thereof, and $R^1$ to $R^7$ and $R^a$ to $R^d$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

3. The compensation film of claim 2, wherein the first structural unit is represented by Chemical Formula 2a or 3a:

Chemical Formula 2a

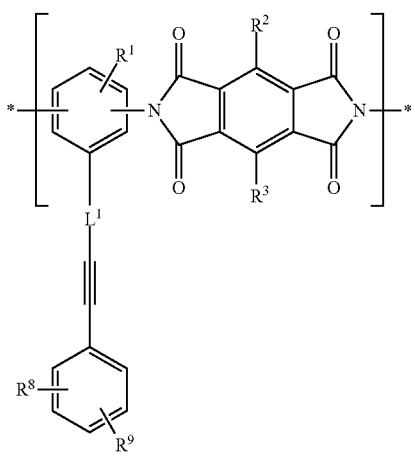

Chemical Formula 3a

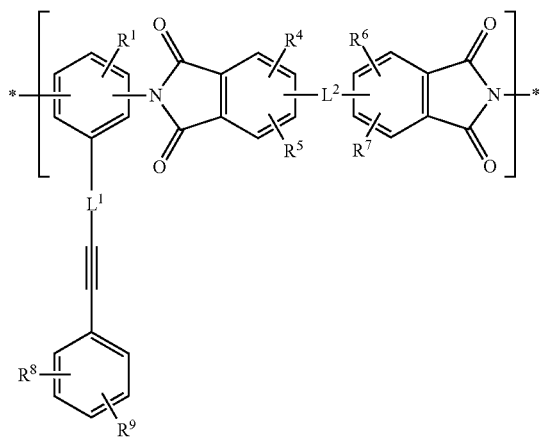

wherein, in Chemical Formulae 2a and 3a, $L^1$ is a single bond, O, C(=O), C(=O)O, or C(=O)NR$^a$, $L^2$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^b$, SiR$^c$R$^d$, S, SO$_2$, or a combination thereof, and $R^1$ to $R^9$ and $R^a$ to $R^d$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

4. The compensation film of claim 1, wherein the polymer further comprises a second structural unit represented by Chemical Formula 4 or 5:

Chemical Formula 4

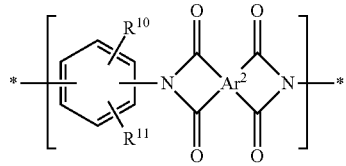

Chemical Formula 5

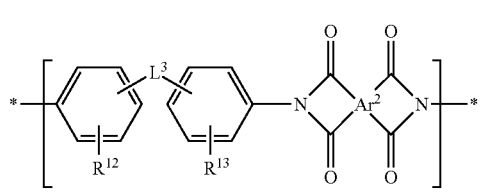

wherein, in Chemical Formulae 4 and 5,

Ar$^2$ is a substituted or unsubstituted C6 to C30 arylene group, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, S, SO$_2$, or a combination thereof, and $R^{10}$ to $R^{13}$ and $R^e$ to $R^g$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

5. The compensation film of claim 4, wherein the second structural unit represented by Chemical Formula 4 is represented by Chemical Formula 4a or 4b:

Chemical Formula 4a

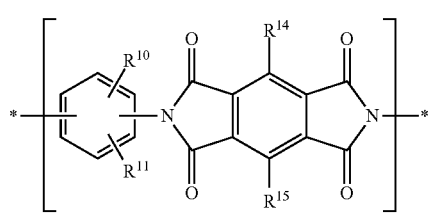

Chemical Formula 4b

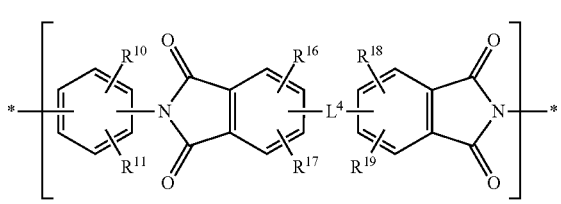

wherein, in Chemical Formulae 4a and 4b, $L^4$ are independently a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, and $R^{10}$, $R^{11}$, $R^{14}$ to $R^{19}$, and $R^h$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

6. The compensation film of claim 4, wherein the second structural unit represented by Chemical Formula 5 is represented by Chemical Formula 5a or 5b:

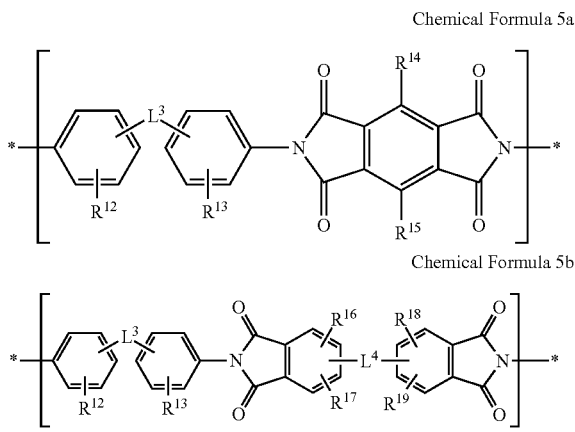

Chemical Formula 5a

Chemical Formula 5b wherein, in Chemical Formulae 5a and 5b, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^e$, SiR$^f$R$^g$, S, SO$_2$, or a combination thereof, $L^4$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, C(=O)NR$^h$, SiR$^i$R$^j$, S, SO$_2$, or a combination thereof, and $R^{12}$ to $R^{19}$ and $R^e$ to $R^j$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

7. The compensation film of claim 4, wherein a mole ratio of the first structural unit and the second structural unit is about 1:99 to about 99:1.

8. The compensation film of claim 4, wherein a mole ratio of the first structural unit and the second structural unit is about 20:80 to about 50:50.

9. The compensation film of claim 1, wherein the compensation film is elongated in a uniaxial or biaxial direction.

10. The compensation film of claim 9, wherein the compensation film is about 1.01 times to about 5.00 times elongated.

11. The compensation film of claim 1, wherein an in-plane retardation at a 550 nanometer wavelength of the compensation film ranges from about 10 nanometers to about 300 nanometers.

12. The compensation film of claim 1, wherein the compensation film has a photoelastic coefficient of about $5 \times 10^{-13}$ square centimeters per dyne to about $40 \times 10^{-13}$ square centimeters per dyne.

13. The compensation film of claim 1, wherein the compensation film has a photoelastic coefficient of less than or equal to about $30 \times 10^{-13}$ square centimeters per dyne.

14. The compensation film of claim 13, wherein the compensation film has a photoelastic coefficient of about $5 \times 10^{-13}$ square centimeters per dyne to about $30 \times 10^{-13}$ square centimeters per dyne.

15. The compensation film of claim 1, wherein a glass transition temperature of the compensation film is greater than or equal to about 300° C.

16. An optical film comprising:
the compensation film of claim 1, and
a polarizer.

17. The optical film of claim 16, wherein the polarizer is a melt-blend of a hydrophobic polymer and a dichroic dye.

18. A display device comprising the compensation film of claim 1.

19. A display device comprising the optical film of claim 16.

* * * * *